United States Patent
Goossen et al.

(10) Patent No.: US 8,996,207 B2
(45) Date of Patent: Mar. 31, 2015

(54) SYSTEMS AND METHODS FOR AUTONOMOUS LANDING USING A THREE DIMENSIONAL EVIDENCE GRID

(71) Applicant: Honeywell International Inc., Morristown, NJ (US)

(72) Inventors: Emray Rein Goossen, Albuquerque, NM (US); Yunqian Ma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 106 days.

(21) Appl. No.: 13/925,128

(22) Filed: Jun. 24, 2013

(65) Prior Publication Data

US 2014/0379179 A1    Dec. 25, 2014

(51) Int. Cl.
G06F 19/00    (2011.01)
G06G 7/70    (2006.01)
G08G 5/02    (2006.01)
G05D 1/06    (2006.01)

(52) U.S. Cl.
CPC ............... *G08G 5/02* (2013.01); *G05D 1/0684* (2013.01); *G08G 5/025* (2013.01)
USPC ......................................................... 701/18

(58) Field of Classification Search
CPC combination set(s) only.
See application file for complete search history.

(56) References Cited

U.S. PATENT DOCUMENTS

| | | | |
|---|---|---|---|
| 7,839,322 B2 * | 11/2010 | Filias et al. ..................... 342/33 |
| 8,121,399 B2 * | 2/2012 | Hayashi et al. ............... 382/154 |
| 8,265,808 B2 | 9/2012 | Garrec et al. |
| 8,276,844 B2 | 10/2012 | Kariv |
| 8,868,344 B2 * | 10/2014 | McKitterick ................. 701/534 |
| 8,872,081 B2 * | 10/2014 | Feldmann et al. ........... 244/3.13 |
| 2006/0125680 A1 * | 6/2006 | Thackray .......................... 342/54 |
| 2006/0178828 A1 * | 8/2006 | Moravec ........................ 701/211 |
| 2008/0023587 A1 * | 1/2008 | Head et al. .................. 244/158.4 |
| 2010/0063730 A1 * | 3/2010 | Case et al. ..................... 701/210 |
| 2011/0307126 A1 | 12/2011 | Hogstrom |
| 2012/0130566 A1 | 5/2012 | Anderson |

(Continued)

OTHER PUBLICATIONS

European Patent Office, "Office Action from EP Application No. 14171996.3 mailed Nov. 21, 2014", "from Foreign Counterpart of U.S. Appl. No. 13/925,128", Nov. 21, 2014, pp. 1-6, Published in: EP.

(Continued)

*Primary Examiner* — Rami Khatib
(74) *Attorney, Agent, or Firm* — Fogg & Powers LLC

(57) ABSTRACT

A method for autonomous landing of an unmanned aerial vehicle (UAV) comprising: obtaining sensor data corresponding to one or more objects outside of the aircraft using at least one onboard sensor; using the sensor data to create a three dimensional evidence grid, wherein a three dimensional evidence grid is a three dimensional world model based on the sensor data; combining a priori data with the three dimensional evidence grid; locating a landing zone based on the combined three dimensional evidence grid and a priori data; validating an open spots in the landing zone, wherein validating includes performing surface condition assessment of a surface of the open spots; generating landing zone motion characterization, wherein landing zone motion characterization includes characterizing real time landing zone pitching, heaving, rolling or forward motion; processing the three dimensional evidence grid data to generate flight controls to land the aircraft in one of the open spots; and controlling the aircraft according to the flight controls to land the aircraft.

20 Claims, 5 Drawing Sheets

(56) References Cited

U.S. PATENT DOCUMENTS

| | | | |
|---|---|---|---|
| 2012/0150441 A1* | 6/2012 | Ma et al. | 701/510 |
| 2012/0158222 A1 | 6/2012 | Ehlin et al. | |
| 2012/0287274 A1 | 11/2012 | Bevirt | |
| 2013/0080050 A1* | 3/2013 | McKitterick | 701/466 |
| 2013/0257852 A1* | 10/2013 | Meeker et al. | 345/419 |

OTHER PUBLICATIONS

Ma et al., "Systems and Methods for Navigation Using Cross Correlation on Evidence Grids", Jun. 13, 2012, pp. 1-15, Published in: EP.

McKitterick, "Systems and Methods for Combining a Priori Data With Sensor Data", Mar. 27, 2013, pp. 1-12, Published in: EP.

* cited by examiner

SYSTEMS AND METHODS FOR AUTONOMOUS LANDING USING A THREE DIMENSIONAL EVIDENCE GRID

BACKGROUND

Autonomous cargo, intelligence, surveillance and reconnaissance (ISR), and other unmanned aerial vehicle (UAV) mission driven systems need full flight profile awareness and guidance through launch, en route, payload delivery, and landing. For landing on sea-based ships, locating the ship, locating the deck landing spot, selecting a deck spot clear of obstacles and vehicles, matching the vertical take-off and landing (VTOL) UAV motion to ship deck motion, and providing guidance to a safe landing at the desired deck spot is needed for full autonomy.

There are normally two aspects to landing a UAV: (1) deciding where to land; and (2) using control signals to guide the aerial vehicle to land. The problem of deciding where to land involves navigation and tracking techniques.

Existing methods include vision-based solutions. They include a nadir-facing camera and an image processing computer. Traditional vision-based approaches to autonomous landing often rely on a high-contrast landmark, such as a large "H" symbol, that can easily be identified by standard image processing algorithms.

SUMMARY

In one embodiment, a method for autonomous landing of an unmanned aerial vehicle (UAV) is provided. The method comprises obtaining sensor data corresponding to one or more objects outside of the aircraft using at least one onboard sensor; using the sensor data to create a three dimensional evidence grid, wherein a three dimensional evidence grid is a three dimensional world model based on the sensor data; combining a priori data with the three dimensional evidence grid; locating a landing zone based on the combined three dimensional evidence grid and a priori data; validating an open spots in the landing zone, wherein validating includes performing surface condition assessment of a surface of the open spots; generating landing zone motion characterization, wherein landing zone motion characterization includes characterizing real time landing zone pitching, heaving, rolling or forward motion; processing the three dimensional evidence grid data to generate flight controls to land the aircraft in one of the open spots; and controlling the aircraft according to the flight controls to land the aircraft.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Existing methods to autonomously land an aircraft depend primarily on being able to identify the high-contrast fixed landmark. Ideal environmental and weather conditions may not always be available. Weather, such as wind, rain, snow, and environmental factors, like lighting, deck motion, dirt, and dust can make it difficult to identify the high-contrast fixed landmark for the vision-based system or algorithm. There may also be occlusion effects involved, which may make things worse.

It is advantageous that a UAV be capable of finding a deck spot landing zone without ship-based guidance signals. A new method is proposed based on UAV onboard sensors to create an evidence grid, and using a priori knowledge, such as a historical evidence grid.

Figure 1:
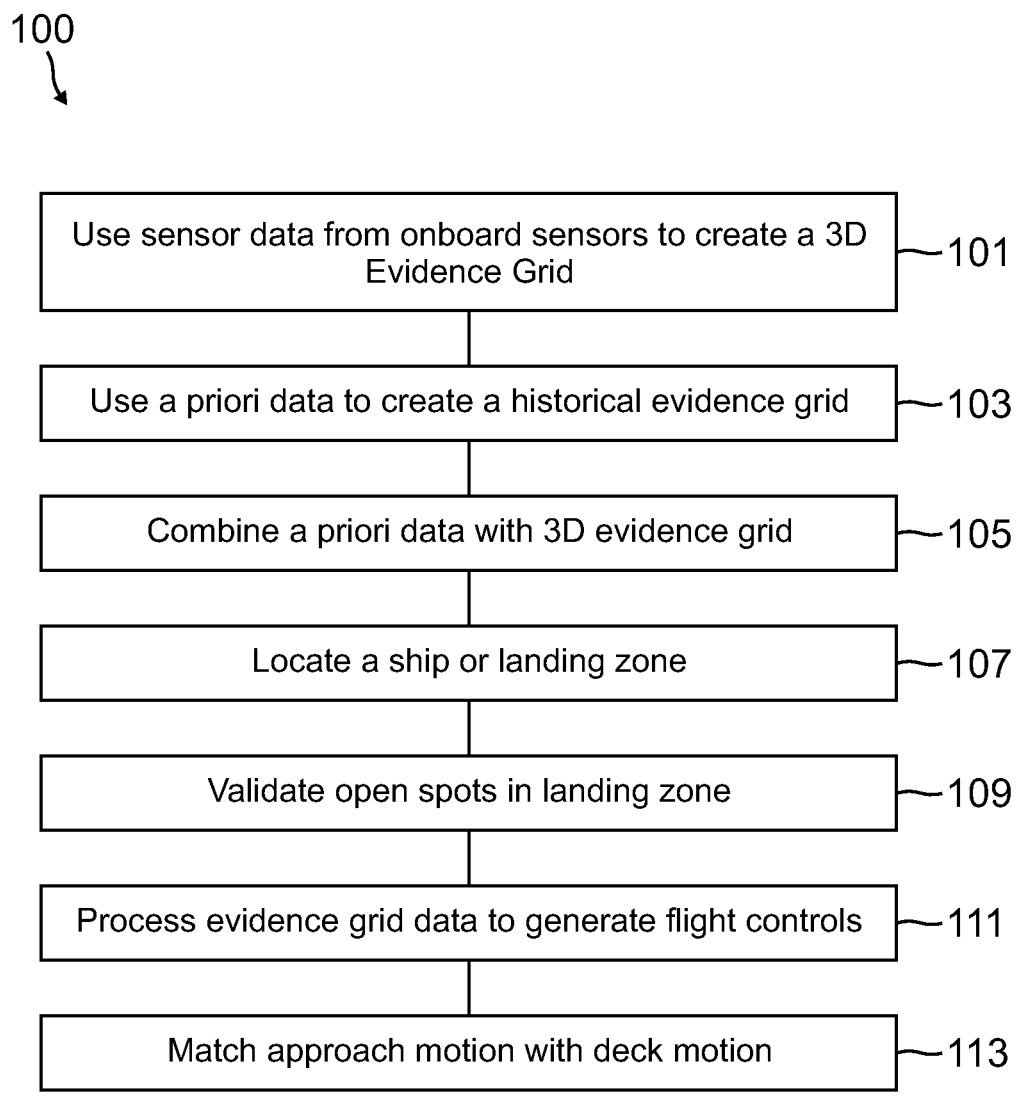
FIG. 1 is a flow chart of an example method of autonomous landing using a three dimensional evidence grid.

FIG. 1 is a block diagram illustrating an example method 100 for autonomous landing on a moving platform. At block 101, sensor data from at least one onboard sensor is combined using sensor fusion to create a three dimensional (3D) evidence grid. A 3D evidence grid comprises a 3D world model, populated by the sensor data. The 3D evidence grid is stored in the memory of the UAV or VTOL. For example, a radar sensor on a UAV scans across airspace, and senses whether and where there is an object. Based on this data, and data from other available sensors on the UAV, the object will be populated in the 3D evidence grid. In one embodiment, the 3D evidence grid is in the form of voxels (i.e., small 3D cubes in the 3D evidence grid). The size of the voxel and the resolution of the sensor determine the obstacle size that can be represented in the evidence grid. In one embodiment, the onboard sensors used to create the 3D evident grid include one or more downward facing sensors. It is to be understood that the one or more downward facing sensors can include multiple sensors, and is not limited to a single sensor. In some embodiments, the one or more downward facing sensors can include a radar, a lidar, an optical sensor, or a combination of such sensors.

At optional block 103, a priori data is used to create a historical evidence grid. In one embodiment, a priori data may be received from a database of existing information. A priori data comprises information such as world models, Digital Terrain Elevation Data (DTED), ship models, visual maps, landmarks such as rivers, hills, mountains, and obstacles, and other such information as may be used as known to those having ordinary skill in the art.

At block 105, a priori data is combined with the 3D evidence grid. The 3D evidence grid is updated and populated with information obtained from the onboard sensors and a priori data, known prior to obtaining data from the sensors. The 3D evidence grid is used to locate a landing zone and deck spot, and to determine whether the deck spot is occupied or valid as discussed in relation to the next blocks. In one embodiment, the a priori data is the historical evidence grid created at optional block 103.

At block 107, a landing zone is located based on the 3D evidence grid. In one embodiment, the landing zone is a ship. Locating a landing zone includes identifying a the landing zone. In the case of a ship, this includes classification of the ship, such as identification of whether it is a cargo ship, carrier, a destroyer, or other kind of ship. The classification allows the system to select the proper ship on which to land, and to pull the correct a priori deck configuration so as to know where the designated landing deck spots are located on the ship. In some cases, there may be more than one ship present, or the ship or landing zone may not be exactly where the UAV or VTOL predicted. Thus, the combined use of the 3D evidence grid and a priori data is used to locate the ship or landing zone. For example, the UAV or VTOL can locate a ship or landing zone based on a matching of a representation in the 3D evidence grid with a profile of a ship or landing zone. When a matching representation in the 3D evidence grid is identified, the UAV or VTOL can associate the matching representation with a ship or landing zone.

Once a ship or landing zone has been located, the ship or landing zone corresponding to the matching representation can be identified. In one embodiment, the location of the aircraft can be used to identify which ship or landing zone corresponds to the matching representation based on the a priori data expectation of ship or landing zone locations at the time. The location of the aircraft can be determined using any appropriate means such as an inertial navigation system (INS) or global positioning system (GPS) onboard the aircraft. With the location of the aircraft known, the identification of the ship or landing zone corresponding to the matching representation can be narrowed down to any ship or landing zone having an expected location within sensor range of the aircraft. In another example, a location of a matching representation in the 3D evidence grid relative to the location of the aircraft can be used to determine a more precise volume within the sensor range of the aircraft in which the located ship or landing zone is. This more precise volume can be compared to expected location(s) of ship(s) or landing zone (s) to identify which ship or landing zone corresponds to the matching representation.

Once a ship or landing zone has been identified in the 3D evidence grid, one or more open spots for landing on the ship or landing zone can be identified. In some embodiments, an open spot for landing is a substantially planar surface. Open deck spots and open spots in a landing zone can be identified based on a priori data corresponding to the identified ship or landing zone. For example, once the matching representation has been linked with a particular ship or landing zone, a priori data regarding that particular ship or landing zone can specify where on that particular ship or landing zone, the open spot(s) for landing are.

At block 109, open deck spots on the ship or open spots in the landing zone are then validated. Validation of open deck spots includes surface assessment, checking for obstacles, other ways of making sure a deck spot is clear to land on, and selecting which open spot to land on. Surface assessment includes, but is not limited to, an assessment of the condition of the landing surface such as the presence of rain or snow, or whether it is grass, dirt, etc. This can be accomplished using onboard sensors. In one embodiment, this is accomplished using a two dimensional interferometric radar.

At block 111, the combined evidence grid data and a priori data is used to generate flight controls to land the aircraft on the selected/validated open spot. The flight controls include an autonomous trajectory guidance function. Generating flight controls includes generating guidance commands to control the UAV or VTOL such that the aircraft appropriately approaches and lands on the selected open spot of the ship or landing zone. In some examples, the ship on which the aircraft is landing may be heaving, pitching and rolling in the waves. In such examples, generating flight controls can include deck spot motion tracking to generate guidance commands to match the approach motion of the UAV to the movement of the deck spot, as indicated at block 113. Matching the deck motion can include calculating the motion of the deck or landing spot based on the 3D evidence grid. A tracking signal that acts as a control law can then be generated to match the approach motion of the aircraft to the deck or landing spot.

Figure 2:
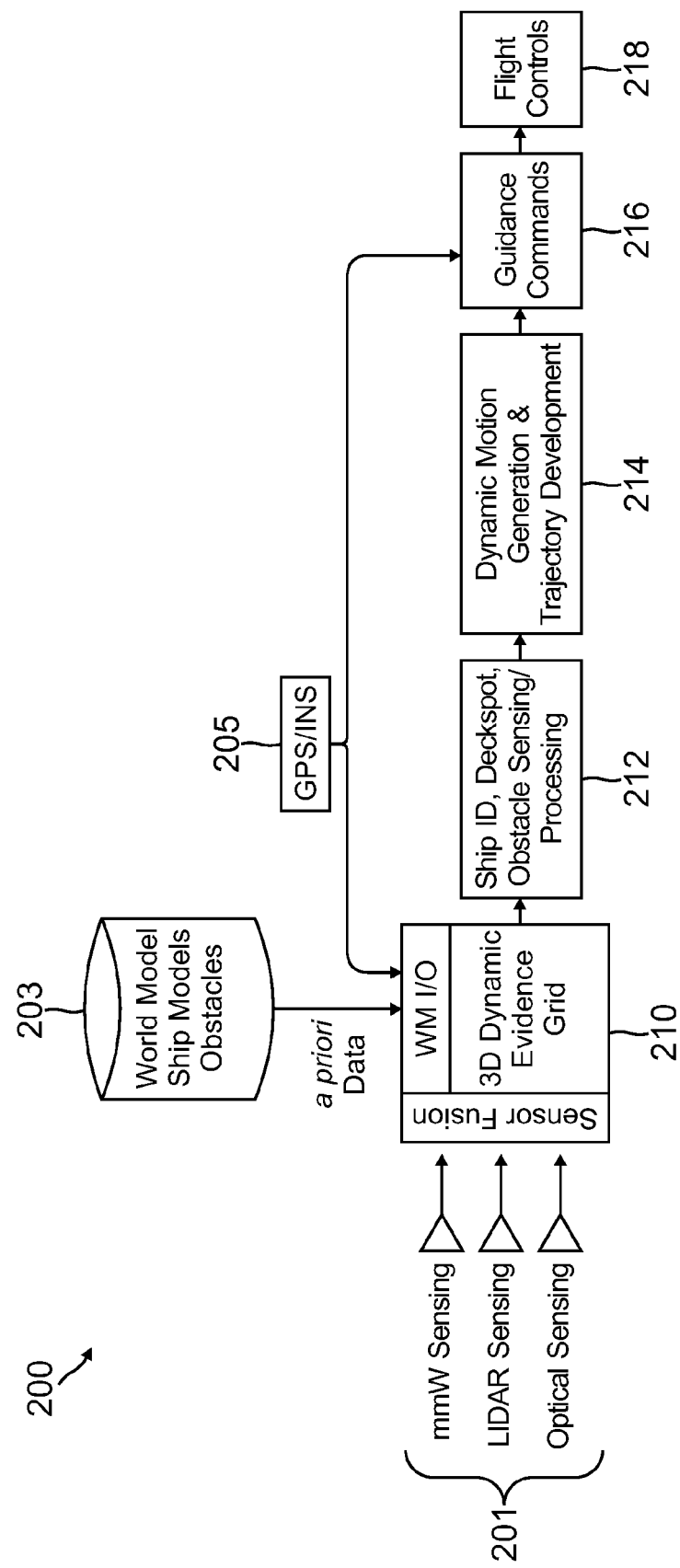
FIG. 2 is a block diagram of an example system for autonomous landing on a moving platform using an evidence grid.

FIG. 2 illustrates a system block diagram of a system 200 for autonomous landing on a moving platform. At 201, data from at least one sensor that provides obstacle and slope information is fused and collected into a 3D evidence grid. In one embodiment, this information is stored in the form of voxels or small 3D cubes in the 3D evidence grid. The size of the cube and the resolution of the sensor determine the obstacle size that can be detected. The deck is large by comparison to the objects involved, so large voxels are used. From these voxels, the deck slope and condition can be determined.

A priori data 203 is merged with the sensor data to identify the ship and to identify potential landing deck spots. A priori data includes, but is not limited to, ship models, ship location, deck size, deck location, obstacles, terrain, landmark information, and other such known or previously acquired information. In one embodiment, this includes data collected from at least one forward facing sensor. INS and/or GPS 205 data is utilized in the ship identification with the a priori data expectation of the ship location at the time when the UAV or VTOL returns.

3D evidence grid data 210 is processed to generate ship ID, deck spot targets, obstacles, and deck position and slope at 212. For example, a long millimeter wave (MMW) radar sensor, LIDAR, or other sensor output provides dynamic ranging, altitude, and deck slope information to the 3D evidence grid. In the final stage of the approach, an optical sensor may provide referenced deck markings to the 3D evidence grid as guide posts for the final spot positioning.

The data being output is dynamic, so this information is used to develop a north, east, and altitude track of the deck motion reflecting pitching, heaving, and rolling of the ship at 214. Deck heaving, pitching, and rolling motion is maintained in the 3D evidence grid as occupied voxels. Thus, the desired deck spot motion develops a 3D deck spot track as an output to the trajectory planner.

The information is then fed to a guidance function 216 that generates flight controls 218 tracking target command to match deck motion and meet the deck. The guidance commands generate target commands to the vehicle flight controls. The autonomous trajectory guidance function utilizes the deck spot track to generate guidance commands to the UAV/VTOL vehicle control system to approach the deck and match the motion of the moving deck so as to land safely.

In one embodiment, system memory on the UAV or VTOL contains instructions that when executed by a processor on the UAV or VTOL cause the operations of the system described in 210-218 to occur. The system memory comprises computer readable medium from which the processor can read the instructions. Suitable computer-readable media may include storage or memory media such as magnetic or optical media. For example, storage or memory media may include conventional hard disks, compact disks, volatile or non-volatile media such as random access memory, read only memory, electrically erasable programmable read only memory, flash memory, etc.

Figure 3:
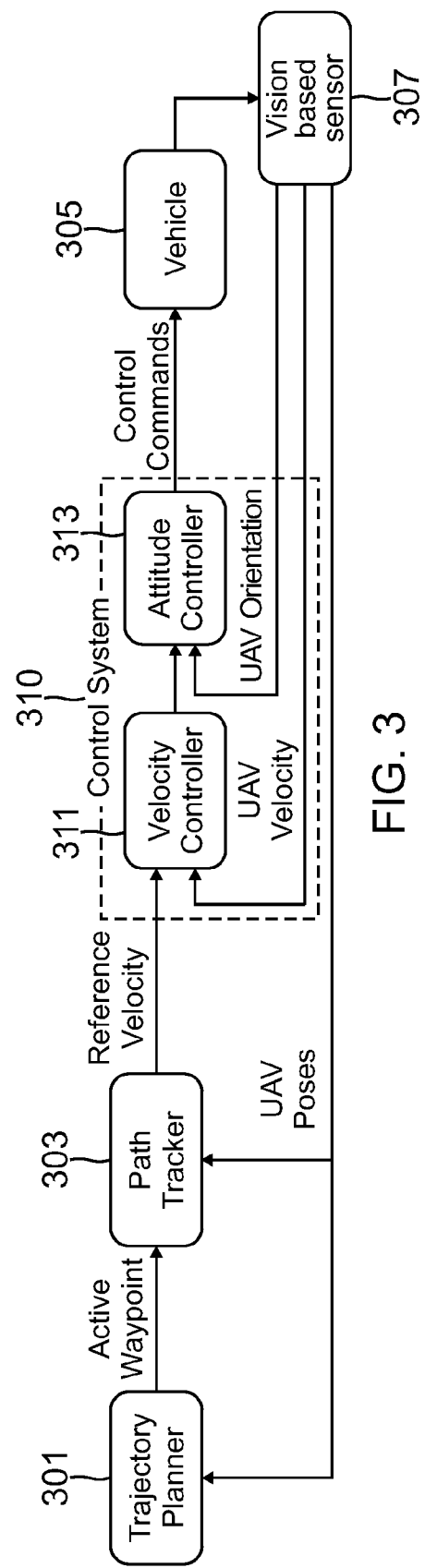
FIG. 3 is a block diagram of an example control system for autonomous landing on a moving platform using an evidence grid.

FIG. 3 is an exemplary control system block diagram for a control system 300 of an autonomous landing on a moving platform according to one embodiment. Trajectory planner 301 creates waypoints to represent a trajectory based on the three dimensional evidence grid and a priori data. Path tracker 303 uses the waypoints to provide control signals to the velocity controller 311 (outer loop controller) of the control system 310. The velocity controller 311 controls the velocity of the UAV, and the output of the velocity controller becomes the input of the attitude controller 313 (inner loop controller). The attitude control controls the orientation of the UAV. The combined outputs of the control system 310 comprise control commands to the vehicle 305. The control commands control the motion of the vehicle itself 305. The movement of the vehicle is captured by a vision based sensor 307 which completes the feedback loop.

Figure 4:
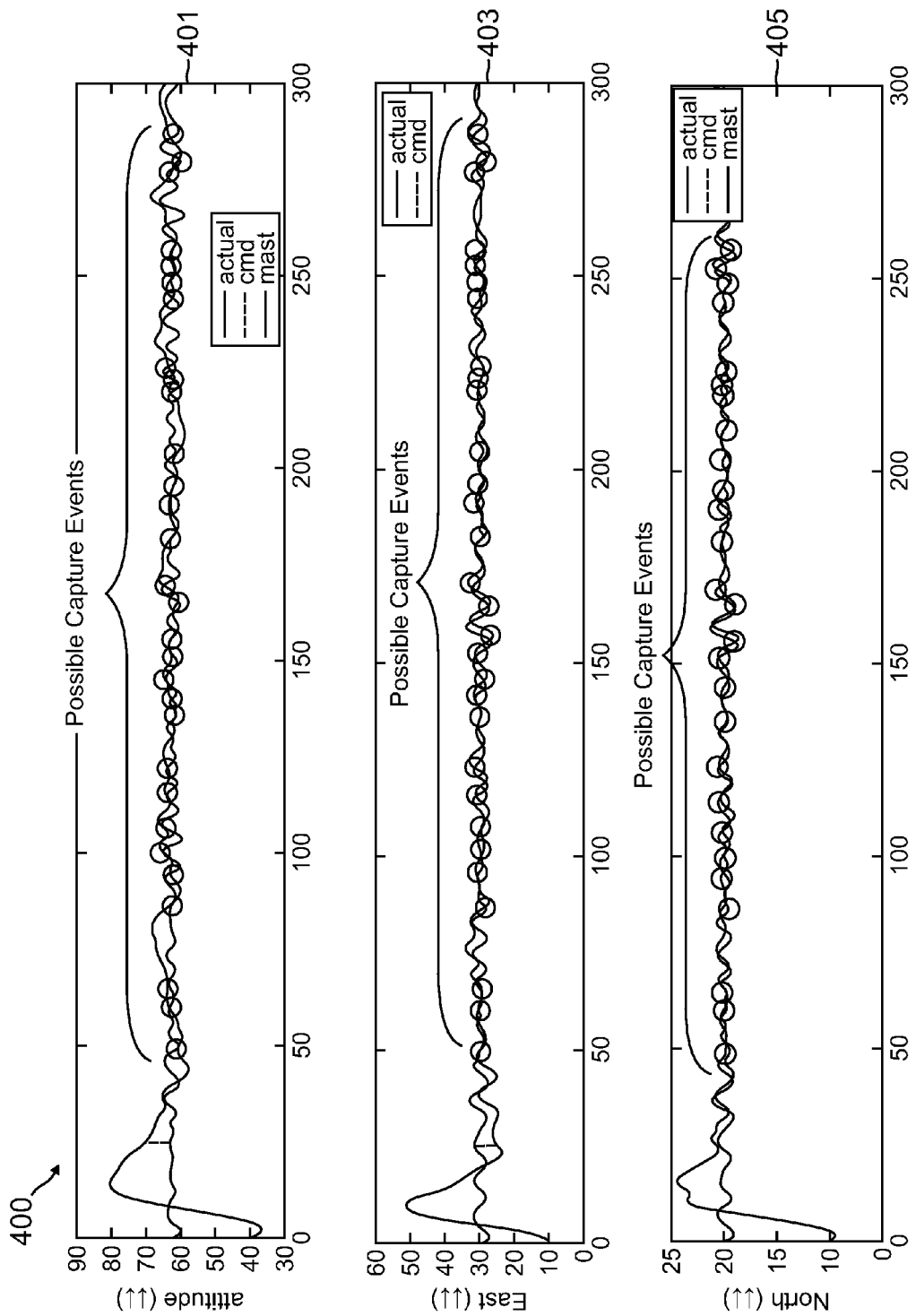
FIG. 4 is a set of graphs illustrating exemplary deck motion capture events.

FIG. 4 illustrates simulated capture events taken by the trajectory guidance system in terms of altitude 401, east distances 403, and north distances 405. The simulations illustrate that in this embodiment, a deck spot landing is captured within 50 seconds. Each of the circles illustrates possible deck spot capture opportunities, or opportunities to land where the vehicle motion has matched the deck motion.

Figure 5:
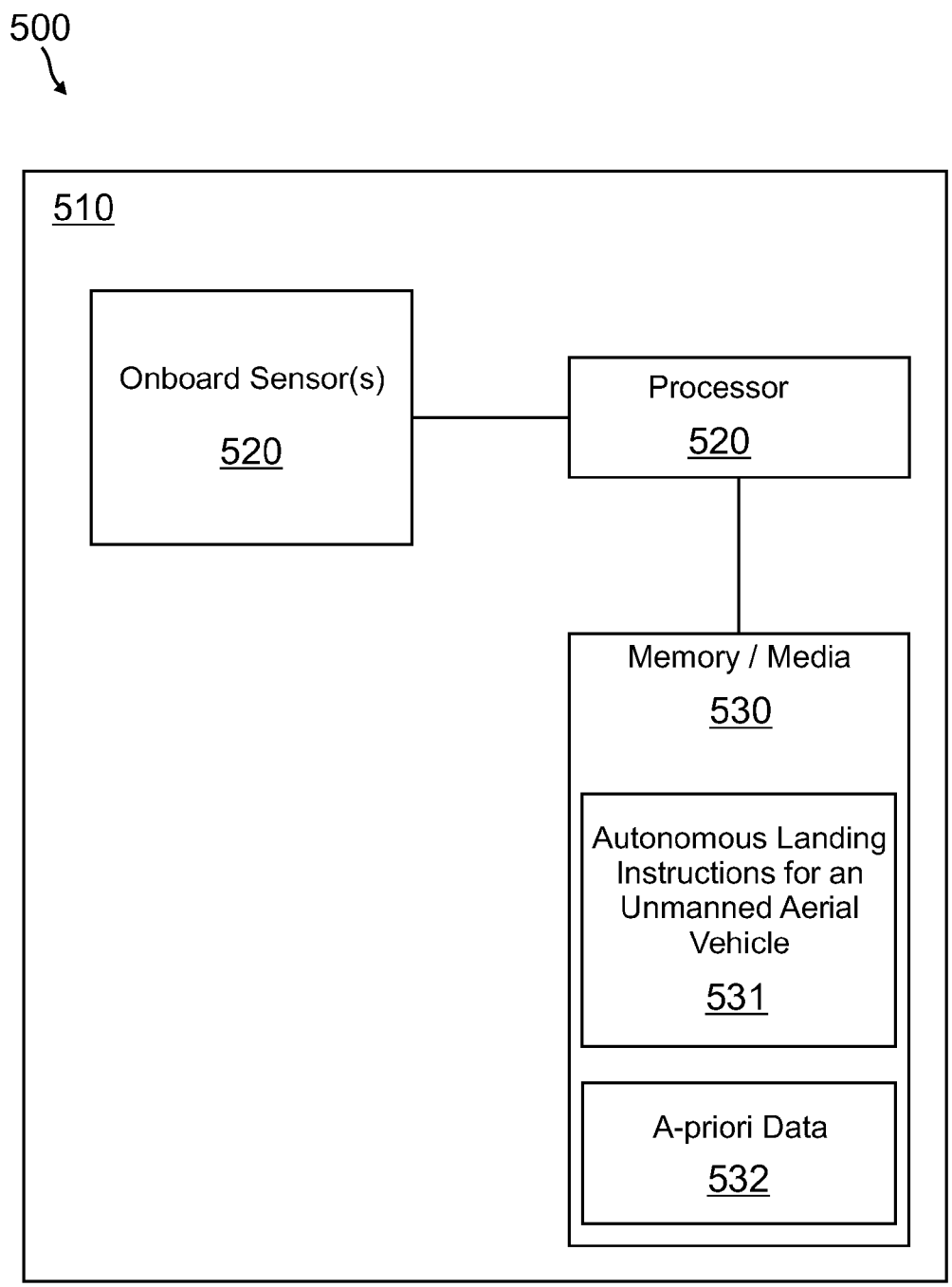
FIG. 5 is a block diagram of exemplary hardware of a system for autonomous landing on a moving platform using an evidence grid.

FIG. 5 illustrates a hardware block diagram according to one embodiment of a system for autonomous landing 500. The system is part of an unmanned aerial vehicle (UAV) 510. The UAV 510 includes at least one onboard sensor 520. The onboard sensors 520 are coupled to a processor 520. Processor 520 is coupled to memory and/or a computer readable medium 530. The computer readable media 530 include autonomous landing instructions for an unmanned aerial vehicle 531, and world model a priori data 532. The instructions for autonomous landing, when executed by processor 520, cause the processor to obtain sensor data from the at least one onboard sensor and create a three dimensional (3D) evidence grid. A 3D evidence grid comprises a 3D world model, populated by the dynamic sensor data and a priori ship and deck models 532. The 3D evidence grid is stored in the memory of the UAV or VTOL. Then, the processor combines a priori data with the 3D evidence grid to navigate to a ship or landing zone. A priori data provides the UAV with an expected location for a ship or other landing zone to where the UAV can navigate. The 3D evidence grid is used in combination with the a priori data to identify real time information such as changed conditions, obstacles, landing zone or ship locations, or positions. Once a ship or landing zone is located, open spots are validated. Open spot validation includes, but is not limited to surface condition assessment, or open spot selection. The processor then uses evidence grid data to plan a trajectory for the UAV. The processor then generates flight controls to follow the trajectory and land. If the landing zone is moving, such as on a ship, the processor uses the 3D evidence grid to match the motion of the UAV to the deck motion to land safely.

EXAMPLE EMBODIMENTS

Example 1 includes a method for autonomous landing of an unmanned aerial vehicle (UAV) comprising: obtaining sensor data corresponding to one or more objects outside of the aircraft using at least one onboard sensor; using the sensor data to create a three dimensional evidence grid, wherein a three dimensional evidence grid is a three dimensional world model based on the sensor data; combining a priori data with the three dimensional evidence grid; locating a landing zone based on the combined three dimensional evidence grid and a priori data; validating an open spots in the landing zone, wherein validating includes performing surface condition assessment of a surface of the open spots; generating landing zone motion characterization, wherein landing zone motion characterization includes characterizing real time landing zone pitching, heaving, rolling or forward motion; processing the three dimensional evidence grid data to generate flight controls to land the aircraft in one of the open spots; and controlling the aircraft according to the flight controls to land the aircraft.

Example 2 includes the method of example 1 wherein the three dimensional evidence grid represents objects as a plurality of voxels.

Example 3 includes the method of any of examples 1-2, comprising: using a priori data to create a historical evidence grid; and combining the historical evidence grid with the three dimensional evidence grid.

Example 4 includes the method of any of examples 1-3, wherein at least one onboard sensor is forward facing.

Example 5 includes the method of any of examples 1-4, wherein the at least one onboard sensor to create a three dimensional evidence grid are downward facing.

Example 6 includes the method of any of examples 1-5, wherein the landing zone is a ship and the open spot is an area on a deck of the ship configured for landing of the UAV.

Example 7 includes the method of any of examples 1-6, comprising: matching approach motion of the UAV to movement of the landing zone, wherein the landing zone is a moving platform.

Example 8 includes the method of example 7, wherein the matching approach motion to movement of the landing zone determines a series of possible landing opportunities.

Example 9 includes a system for autonomous landing of an unmanned aerial vehicle (UAV) comprising: at least one onboard sensor configured to collect data that provides information used to generate a three dimensional evidence grid; a processor coupled to the at least one onboard sensor; a computer readable medium; wherein, the computer readable medium includes instructions for the processor to execute autonomous landing on a moving platform, causing the processor to: collect sensor data from the at least one onboard sensor; generate a three dimensional evidence grid based on the sensor data; combine a priori data with the three dimensional evidence grid, wherein a priori data provides a world model database based on information known prior to sensing with the at least one onboard sensor; locate a landing zone based on the combined three dimensional evidence grid and a priori data; validate open spots in the landing zone, wherein validating includes performing surface condition assessment, wherein the landing is a planar platform; generate landing zone motion characterization, wherein landing zone motion characterization includes characterizing real time landing zone pitching, heaving, rolling or forward motion; and process the three dimensional evidence grid data to generate flight controls.

Example 10 includes the system of example 9, wherein the at least one onboard sensor further comprises at least one forward facing sensor.

Example 11 includes the system of any of examples 9-10, wherein the at least one onboard sensor is downward facing.

Example 12 includes the system of any of examples 9-11, wherein a priori data is used to make a historical evidence grid, wherein the historical evidence grid is combined with the three dimensional evidence grid.

Example 13 includes the system of any of examples 9-12, wherein the computer readable medium contains further instructions to generate flight controls that match approach motion to movement of the landing zone, wherein the landing zone is a moving platform, wherein the approach motion is movement of an unmanned aerial vehicle or vertical takeoff and landing vehicle on which the system is found.

Example 14 includes the system of example 12, wherein possible landing opportunities are determined once the movement of the UAV is matched to the movement of the landing zone.

Example 15 includes the system of any of examples 9-14, wherein one of the at least one onboard sensor is an interferometric radar.

Example 16 includes an apparatus comprising: at least one onboard sensor configured to collect data that provides information used to generate a three dimensional evidence grid; a trajectory planner configured to create waypoints to represent a trajectory based on the three dimensional evidence grid, wherein the trajectory planner: combines a priori data with the three dimensional evidence grid, wherein a priori data provides a world model database based on previously known information; locates a landing zone based on combined the combined three dimensional evidence grid and a priori data; validates open spots in the landing zone, wherein validating includes performing surface condition assessment, wherein the landing is a planar platform; and processes the three dimensional evidence grid data to generate flight controls; generates landing zone motion characterization, wherein landing zone motion characterization includes characterizing real time landing zone pitching, heaving, rolling or forward motion; a path tracker coupled to the trajectory planner, the path tracker configured to use waypoints to provide control signals to the control system; a control system further comprising: a velocity controller configured to control the velocity of an unmanned aerial vehicle; and an attitude controller configured to control the orientation of the unmanned aerial vehicle; the control system configured to generate control commands based on the control signals.

Example 17 includes the apparatus of example 16, wherein the trajectory planner generates flight controls that match approach motion to movement of the landing zone, wherein the landing zone is a moving platform, wherein the approach motion is movement of an unmanned aerial vehicle or vertical takeoff and landing vehicle on which the system is found.

Example 18 includes the apparatus of any of examples 16-17, wherein the trajectory planner determines landing opportunities based on the matched approach motion and movement of the landing zone; the path tracker generating control signals based on the landing opportunities; the control system generating control commands based on the control signals to land the unmanned aerial vehicle.

Example 19 includes the apparatus of any of examples 16-18, wherein a priori data is collected from the at least one onboard sensors, wherein at least one of the at least one onboard sensors is forward facing.

Example 20 includes the apparatus of any of examples 16-19, wherein a priori data is represented as a historical evidence grid used by the trajectory planner.

What is claimed is:

1. A method for autonomous landing of an unmanned aerial vehicle (UAV) comprising:
    obtaining sensor data corresponding to one or more objects outside of the aircraft using at least one onboard sensor;
    using the sensor data to create a three dimensional evidence grid, wherein a three dimensional evidence grid is a three dimensional world model based on the sensor data;
    combining a priori data with the three dimensional evidence grid;
    locating a landing zone based on the combined three dimensional evidence grid and a priori data;
    validating open spots in the landing zone, wherein validating includes performing surface condition assessment of a surface of the open spots;
    generating landing zone motion characterization, wherein landing zone motion characterization includes characterizing real time landing zone pitching, heaving, rolling or forward motion;
    processing the three dimensional evidence grid data to generate flight controls to land the aircraft in one of the open spots; and
    controlling the aircraft according to the flight controls to land the aircraft.

2. The method of claim 1 wherein the three dimensional evidence grid represents objects as a plurality of voxels.

3. The method of claim 1, comprising:
    using a priori data to create a historical evidence grid; and
    combining the historical evidence grid with the three dimensional evidence grid.

4. The method of claim 1 wherein at least one onboard sensor is forward facing.

5. The method of claim 1, wherein the at least one onboard sensor to create a three dimensional evidence grid are downward facing.

6. The method of claim 1 wherein the landing zone is a ship and the open spot is an area on a deck of the ship configured for landing of the UAV.

7. The method of claim 1, comprising:
    matching approach motion of the UAV to movement of the landing zone, wherein the landing zone is a moving platform.

8. The method of claim 7, wherein the matching approach motion to movement of the landing zone determines a series of possible landing opportunities.

9. A system for autonomous landing of an unmanned aerial vehicle (UAV) comprising:
    at least one onboard sensor configured to collect data that provides information used to generate a three dimensional evidence grid;
    a processor coupled to the at least one onboard sensor;
    a computer readable medium; wherein,
        the computer readable medium includes instructions for the processor to execute autonomous landing on a moving platform, causing the processor to:
        collect sensor data from the at least one onboard sensor;
        generate a three dimensional evidence grid based on the sensor data;
        combine a priori data with the three dimensional evidence grid, wherein a priori data provides a world model database based on information known prior to sensing with the at least one onboard sensor;
        locate a landing zone based on the combined three dimensional evidence grid and a priori data;
        validate open spots in the landing zone, wherein validating includes performing surface condition assessment, wherein the landing is a planar platform;
        generate landing zone motion characterization, wherein landing zone motion characterization includes characterizing real time landing zone pitching, heaving, rolling or forward motion; and
        process the three dimensional evidence grid data to generate flight controls.

10. The system of claim 9, wherein the at least one onboard sensor further comprises at least one forward facing sensor.

11. The system of claim 9, wherein the at least one onboard sensor is downward facing.

12. The system of claim 9, wherein a priori data is used to make a historical evidence grid, wherein the historical evidence grid is combined with the three dimensional evidence grid.

13. The system of claim 12, wherein possible landing opportunities are determined once the movement of the UAV is matched to the movement of the landing zone.

14. The system of claim 9, wherein the computer readable medium contains further instructions to generate flight controls that match approach motion to movement of the landing zone, wherein the landing zone is a moving platform, wherein the approach motion is movement of an unmanned aerial vehicle or vertical takeoff and landing vehicle on which the system is found.

15. The system of claim 9, wherein one of the at least one onboard sensor is an interferometric radar.

16. An apparatus comprising:
   at least one onboard sensor configured to collect data that provides information used to generate a three dimensional evidence grid;
   a trajectory planner configured to create waypoints to represent a trajectory based on the three dimensional evidence grid, wherein the trajectory planner:
      combines a priori data with the three dimensional evidence grid, wherein a priori data provides a world model database based on previously known information;
      locates a landing zone based on combined the combined three dimensional evidence grid and a priori data;
      validates open spots in the landing zone, wherein validating includes performing surface condition assessment, wherein the landing is a planar platform; and
      processes the three dimensional evidence grid data to generate flight controls;
      generates landing zone motion characterization, wherein landing zone motion characterization includes characterizing real time landing zone pitching, heaving, rolling or forward motion;
   a path tracker coupled to the trajectory planner, the path tracker configured to use waypoints to provide control signals to the control system;
   a control system further comprising:
      a velocity controller configured to control the velocity of an unmanned aerial vehicle; and
      an attitude controller configured to control the orientation of the unmanned aerial vehicle;
   the control system configured to generate control commands based on the control signals.

17. The apparatus of claim 16, wherein the trajectory planner generates flight controls that match approach motion to movement of the landing zone, wherein the landing zone is a moving platform, wherein the approach motion is movement of an unmanned aerial vehicle or vertical takeoff and landing vehicle on which the system is found.

18. The apparatus of claim 17, wherein the trajectory planner determines landing opportunities based on the matched approach motion and movement of the landing zone; the path tracker generating control signals based on the landing opportunities; the control system generating control commands based on the control signals to land the unmanned aerial vehicle.

19. The apparatus of claim 16, wherein a priori data is collected from the at least one onboard sensors, wherein at least one of the at least one onboard sensors is forward facing.

20. The apparatus of claim 16, wherein a priori data is represented as a historical evidence grid used by the trajectory planner.

\* \* \* \* \*